United States Patent [19]
Wallgren et al.

[11] Patent Number: 5,241,156
[45] Date of Patent: Aug. 31, 1993

[54] HAND-HELD HEATING DEVICE FOR ELECTRICAL COMPONENT INSTALLATION/REMOVAL AND IMPROVED TIPS FOR USE THEREWITH

[75] Inventors: Linus E. Wallgren, Rockville; William J. Siegel, Silver Spring, both of Md.

[73] Assignee: Pace, Incorporated, Laurel, Md.

[21] Appl. No.: 394,966

[22] Filed: Aug. 17, 1989

[51] Int. Cl.$^5$ .............................. B23K 3/00; H05B 3/00
[52] U.S. Cl. .................................. 219/233; 219/85.16; 219/85.18; 219/221; 219/230; 219/243; 228/51; 228/180.1; 228/264
[58] Field of Search .......................... 219/221, 227–235, 219/243, 85.1, 85.16, 85.18; 228/51–55, 180.1, 180.2, 191, 264

[56] References Cited

U.S. PATENT DOCUMENTS

| | | | |
|---|---|---|---|
| 2,012,335 | 8/1935 | Bergen | 219/233 X |
| 2,162,615 | 6/1939 | Harlan . | |
| 2,359,393 | 10/1944 | Sloan | 219/233 |
| 2,429,039 | 10/1947 | Warner . | |
| 2,476,680 | 7/1949 | Norgard | 219/233 X |
| 3,139,777 | 7/1964 | Gindoff . | |
| 3,143,635 | 8/1964 | Hooker | 219/221 |
| 3,526,750 | 9/1970 | Siegel . | |
| 3,558,854 | 1/1971 | Siegel . | |
| 3,632,973 | 1/1972 | O'Keefe . | |
| 3,673,384 | 6/1972 | Burman et al. | 219/233 X |
| 3,691,342 | 9/1972 | Giles et al. | 219/233 |
| 3,752,017 | 8/1973 | Lloyd et al. . | |
| 3,786,228 | 1/1974 | Castellana et al. | 219/233 |
| 3,804,320 | 4/1974 | Vandermark . | |
| 3,895,214 | 7/1975 | Winter . | |
| 3,980,861 | 9/1976 | Fukunaga . | |
| 4,034,202 | 7/1977 | Vandermark . | |
| 4,367,396 | 1/1983 | Ravinsky . | |
| 4,412,123 | 10/1983 | Ammann et al. | 219/233 |
| 4,912,743 | 3/1990 | Zeltner | 219/85.16 |

FOREIGN PATENT DOCUMENTS

| | | | |
|---|---|---|---|
| 2641439 | 7/1990 | France | 219/85.16 |
| 02202361 | 8/1989 | Japan | 228/57 |

OTHER PUBLICATIONS

"Boron-Nitride Coated Thermode Blade for Surface-Mounted Technology" IBM Technical Disclosure Bulletin vol. 31, No. 3, Aug. 1988.
"Soldering Tool" by N. F. Jensen, IBM Technical Disclosure Bulletin, vol. 11, No. 2, Jul. 1968.

Primary Examiner—Anthony Bartis
Attorney, Agent, or Firm—Sixbey, Friedman, Leedom & Ferguson

[57] ABSTRACT

A component installation/removal tweezer-type handpiece having two arms and a tinnable or nontinnable tip including a pair of legs respectively removably mounted with respect to the arms and a plurality of serially connected bands attached to the first and second legs such that an opening is formed within the serially connected bands so that the bands are adapted, upon closure of the tweezer-type handpiece, to clamp the terminals of an electronic component or the like and transmit heat to the terminals. In another embodiment a tweezer-type or probe-type handpiece includes a tinnable or nontinnable tip having first and second legs and one or more bands extending between the legs whereby the band(s) is adapted to transfer heat to terminals associated with an electronic component. In all embodiments of the invention the tips may be provided with a variety of sheathing or overlayer combinations to achieve a variety of application requirements. Various configurations may be provided to the outside overlayer to effect selective contact and heat transfer to a variety of components with the same basic tip.

91 Claims, 6 Drawing Sheets

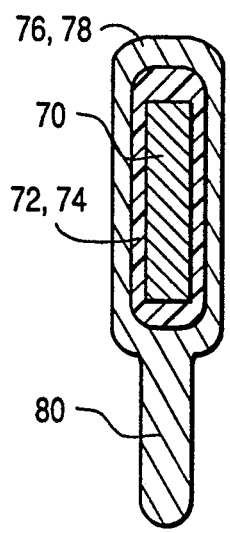
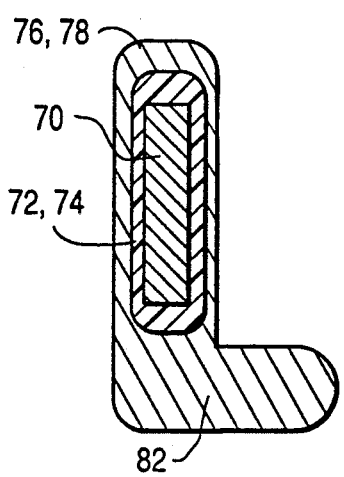
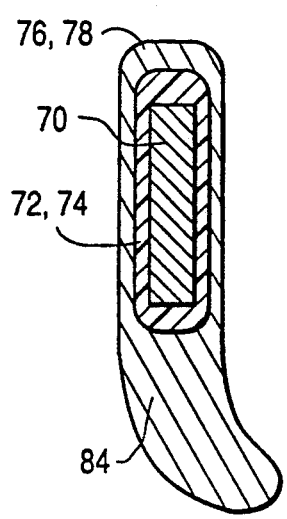
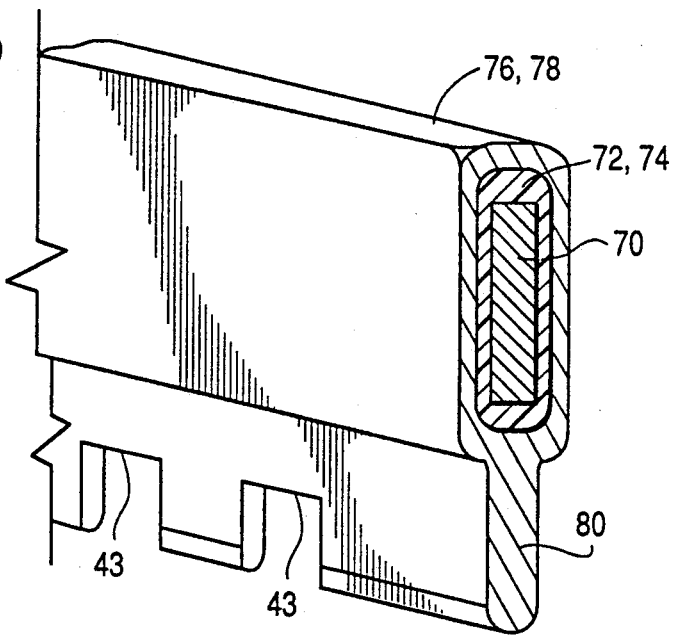
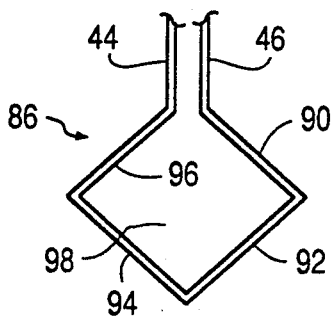
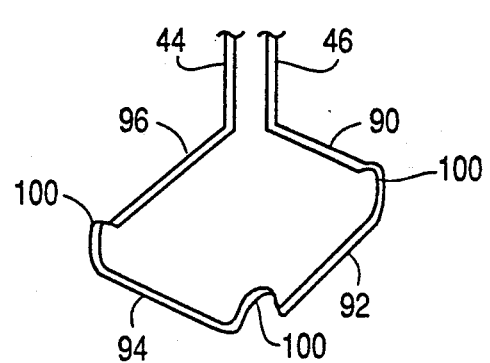

HAND-HELD HEATING DEVICE FOR ELECTRICAL COMPONENT INSTALLATION/REMOVAL AND IMPROVED TIPS FOR USE THEREWITH

BACKGROUND AND OBJECTS OF THE INVENTION

This invention relates to component installation/removal devices and improved tips for use therewith and, in particular, to hand-held devices where heat generated at the tip is produced by electrical current conducted through the tip.

In general, the devices of the present invention are typically usable with components mounted on a substrate such as a PCB where such components include surface mounted devices (SMD's) and thru-hole devices, sockets, plugs, connectors, heat sinks, etc. where the component may have leads or terminals at one or more sides thereof, it being understood that the terms "leads" and "terminals" are used interchangeably hereinafter. Moreover, in general, a substrate such as a PCB includes anything not a component such as ground and voltage planes, all circuitry, laminates, conformal coatings, board stiffeners, etc.

Component operations include removal, installation, replacement, re-positioning, adding solder, removing solder, reflowing solder, curing and/or overcuring adhesives and coatings, etc. When removing or installing certain components from a substrate in certain applications of the invention, it may be desirable to heat the leads or terminals of the component in order to melt the solder associated with the leads. In such instances, the metallized castellations of a so-called leadless chip carrier would be considered the leads or terminals of the component.

With the foregoing definitions in mind, the invention and the background thereof will now be described in terms of specific applicat.ions, it being understood, there is no intent to limit the invention to such applications. Rather, the scope of the invention extends to the wide variety of applications suggested by the above definitions and other applications which will occur to those engaged in this art.

Heretofore, as exemplified by U.S. Pat. Nos. 3,804,320 and 4,034,202, tweezer-type devices have been employed to engage the terminals at opposite sides of an integrated circuit component such as a dual-in-line package (DIP) to effect removal of the component from a printed circuit board (PCB) or the like. In these devices the tips respectively associated with the arms of the tweezer-type device are similar to soldering iron tips in that heating elements respectively disposed at the arms generate heat which is conducted to the tips. This heat melts the solder connecting the component to the board to thus facilitate installation or removal of the component. The tips disclosed in the above patents are designed to engage opposite sides of a DIP or the like. Other tips are known which are bifurcated such that each tip engages adjacent sides of the component so that both tips engage all four sides of those components having terminals at each side thereof.

The above devices have certain shortcomings in that the use of heat conducting tips of the type typically used in soldering irons or the like are relatively thick at the distal ends thereof and thus it is difficult to insert such tips between closely spaced adjacent components without subjecting an adjacent, good component to the possibility of damage. In particular, the solder joints of an adjacent component should not be crystallized by the application of heat to a component being replaced or installed since such crystallization impairs the electrical connection effected by the solder joint.

Accordingly, it is a first object of the present invention to provide an improved component removal/installation device having an improved tip which can more readily be inserted between closely spaced adjacent components. For example, Plastic Leaded Chip Carriers (PLCC) are presently spaced as close as 20 mils apart. Thus, it is an object of this invention to provide improved tips which can be readily inserted between adjacent PLCC's or the like without damaging the adjacent component.

Another shortcoming associated with the prior art devices is that the heat is not generated at the point where it is needed—that is, at the terminals of the component. Thus, in soldering iron-type devices, the heat is produced in a coil or the like substantially removed from where it is needed and transferred via the tip to the solder to be melted which results in heat loss and inefficiency of heat utilization.

Accordingly, it is a further object of the invention to provide an improved component installation/removal device where the heat is produced precisely where it is needed thus providing efficient heat generation.

Another problem associated with the soldering iron tips of the prior art is that they are relatively massive and hence heat tends to radiate therefrom. This radiated heat tends to raise the temperature of the adjacent solder joints and thus for this further reason the tips of the prior art devices are undesirable.

Accordingly, a further object of the invention is the provision of a improved component installation/removal device utilizing an improved tip wherein heat radiation from the tip is minimized.

Another shortcoming associated with the tips of the prior art devices is also related to the relatively massive character of the tips. That is, as described in copending Application entitled "Component Adaptable Heating Devices for Removing and Installing Components With Respect to a Substrate and Improved Control Circuitry for Use Therewith" having Ser. No. 07/395,073 and filed Aug. 17, 1989, now abandoned, and assigned to the assignee of the present application (the foregoing application being incorporated herein by reference), it is desirable to controllably raise the temperature of the component or its terminals. However, due to the high temperature (typically above solder melt temperature and the large thermal mass of soldering iron-type tips, heat can not be controllably transferred to the component terminals. Rather, heat transfer occurs rapidly and in an uncontrolled manner such that not only the component is subject to thermal damage but adjacent components and their soldered joints are also subject to such damage. This thermal damage may include overheating, thermal shock, and other types of thermal degradation.

Accordingly, it is a further object of the present invention to provide a device and improved tip which avoids thermal damage and unwanted heating and crystallization of adjacent solder joints often associated with soldering iron-type devices, or with unfocused hand-held hot air reflow devices, where the thermal mass and/or material of the improved tip is such that the tip may be heated in a controlled manner and subsequently cool down rapidly.

In particular, it is a further object of the present invention to provide small, low mass tips which can fit into tight, hard-to-reach places to engage the terminals of a component to be installed or removed, and which allow a relatively unobstructed view of and access to the component from the top - that is, "z-axis" viewing and access. Upon application of electrical current to the tip, the temperature of the terminals is increased at a controlled rate to at least solder reflow temperature. After solder reflow, the tip (which may be tinnable or non-tinnable) continues to engage the component leads. Accordingly, installation or removal of surface mounted devices (SMD's) can be effectively implemented. The controlled temperature ramp-up not only minimizes thermal shock or other thermal damage to sensitive components, but also drives off solder paste volatiles before solder melt, thereby reducing the chance of solder ball formation and spattering.

As stated above, the tips may engage the terminals of a component. In particular, in accordance with a further object of the invention, the tips may have various configurations including those adapted to grasp the terminals of J-leaded or leadless type components or to clamp the gull-wing leads of a flat pack or the like.

Moreover, it is a further object of the invention that the tips be provided with a tinnable layer to thus effect a soldering iron device or the like wherein heat generation occurs within the tip due to the passage of electrical current therethrough, the heat then being transferred to the tinnable layer. Thus, heat generation occurs in the tip rather than in a coil or the like far removed from the working end of the tip as is the case with conventional soldering irons.

It is still a further object of the present invention that the tips be provided with a variety of sheathing or overlayer combinations to achieve various application requirements. One such combination would consist of an electrically-insulative, heat-conductive, non-tinnable sleeve which would effect heat transfer from the tip to the work yet prevent any leakage current produced by the tip from passing to sensitive components or board circuitry thereby preventing any possible damage. Such an electrically-insulative sleeve or overlayer could either consist of a compliant material such as fiberglass braid or wrap, or a non-compliant or rigid material such as a ceramic compound; however the compliant material would have the additional advantage of facilitating good tip-component or tip-component lead contact and thus, good heat transfer.

In accordance with a further object of the invention, an alternative sheathing or overlayer combination may include one of the above mentioned electrically-insulative, heat-conductive sleeves with an additional metallic overwrap covering this sleeve, which would, in turn contact the component or component leads. This metallic overwrap may either be tinnable or non-tinnable and compliant or rigid (or any combination thereof) and would also serve to make the tip more wear or abrasion resistant than a tip with the electrically-insulative sheathing alone.

Moreover, in accordance with a preferred embodiment of the invention, the foregoing metallic overwrap may be provided in various configurations to thereby effect selective contact and heat transfer to a variety of components with the same basic tip.

A further shortcoming with the prior art devices and, in particular, those devices which have bifurcated tips to facilitate engagement with all four terminal sides of a component is that, due to the rigidity of the tips and the fixed orientations thereof with respect to the tweezer arms, the registration thereof with respect to the component terminals must be essentially perfect in order to ensure good thermal contact with the terminals at each side. To ensure such registration is difficult and expensive.

Accordingly, another object of the invention is to provide an improved tip capable of easily establishing a good thermal contact with the terminals along the length of each side of an integrated circuit component or the like to thus facilitate removal or mounting of the component with respect to a printed circuit board or the like.

These and other objects of the invention will become apparent from a reading of the following specification and claims taken with the drawing.

BRIEF DESCRIPTION OF THE DRAWINGS

FIGS. 10A through 10C are cross-sectional views of preferred, illustrative modifications of metallic overcoatings of the FIG. 9A and 9B embodiments to effect selective heat transfer.

FIG. 10D is a cross-sectionall perspective view of the FIG. 10A embodiment with cut-outs provided along the length thereof.

FIGS. 11A and 11B are perspective views of further improved tips in accordance with the invention.

DETAILED DESCRIPTION OF PREFERRED EMBODIMENTS

Figure 1:
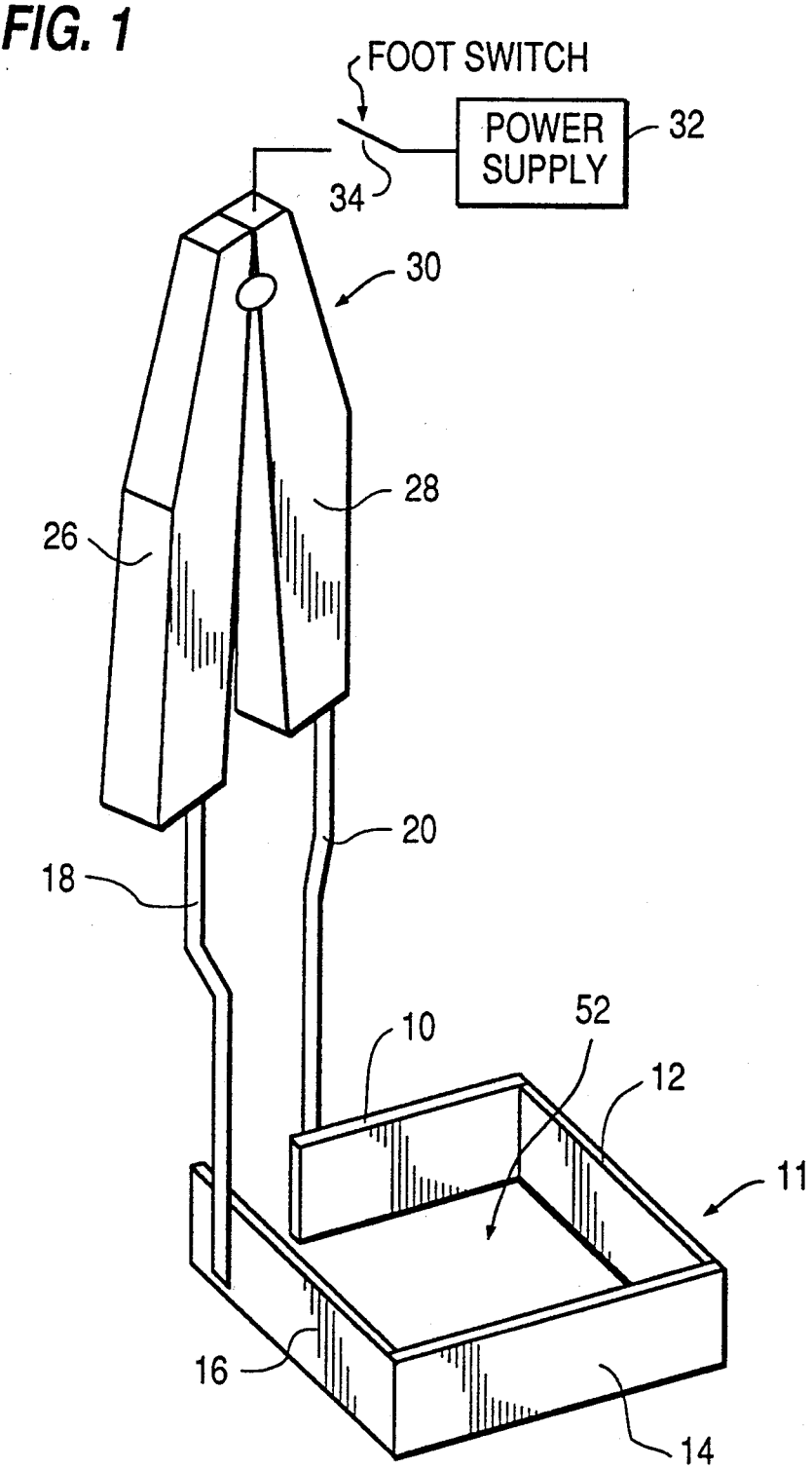
FIG. 1 is a perspective view of an illustrative tweezer-type component installation/removal device utilizing an illustrative tip in accordance with the present invention.

Reference should now be made to the drawing where like reference numerals refer to like parts.

Figure 2:
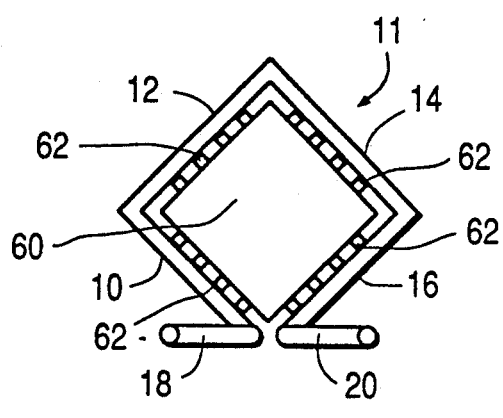
FIG. 2 is a plan view of the tip of FIG. 1
Figure 3:
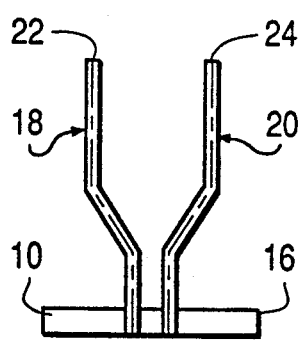
FIG. 3 is a side view of the tip of FIG. 1.

Referring to FIGS. 1-3 and, in particular FIG. 1, there is illustrated in perspective view a band tip 11 in accordance with the present invention where the tip includes sides 10, 12, 14 and 16 and where each side comprises a band of uniform height which may for example be about 0.10 inch. In certain embodiments of the invention, the tip engages the terminals at the sides of a component. For these tips, the height of the band is generally such as to promote good engagement with the component terminals. The thickness of each band is typically about 10 mils and generally 5–40 mils although they may be thicker or thinner depending on such factors as the spacing of components on the boards to be processed and the optional presence of an electrically insulative overlayer with or without metallic overwrap, as will be described in detail hereinafter. Thus, in general, the thickness should be such as to facilitate insertion of tip 11 between closely spaced (20 mils, for example) components on a PCB. The length of each side of tip 11 depends on the particular component the tip 11 is designed to process. Hence, a number of tips are contemplated where each tip corresponds to a particular component or components closely related in size or configuration.

Moreover, tip 11 may be a flat wire comprising Inconel or some other suitable alloy which maintains mechanical strength at relatively high temperatures such as nickel-chrome. Moreover, the material should preferably be such as to facilitate a controlled increase and/or decrease in the temperature thereof to thereby minimize or eliminate thermal shock or other thermal damage to the component.

Although illustrative values of various characteristics of the tip have been given above, there is no intent to limit these characteristics to these values. Moreover, the tip, although desirably used in applications where the temperature of the component terminals is increased or decreased in a controlled manner, can also have characteristics where the thermal mass, size and/or material may be such that the tip temperature does not so respond to changes in heat applied to or removed therefrom.

As can be seen in FIGS. 1–3, legs 18 and 20 are respectively connected to the adjacent corners of sides 10 and 16 where the legs are angled outwardly at an intermediate portion thereof such that the proximal ends 22 and 24 are adapted to engage arms 26 and 28 of a tweezer 30. A tweezer which can be used in the subject invention corresponds to that illustrated in FIG. 1b of U.S. Pat. No. 3,752,017, assigned to the assignee of the subject application, which patent is incorporated herein by reference.

Referring to FIG. 2, a component 60 having J-type leads or terminals 62 is shown in plan view disposed within tip 11. Upon closure of the tweezers, tip 11 will grasp leads 62 such that the bands 10–16 will provide good clamping contact on the leads at each of the four sides of the component due to flexibility of the tip which, in turn, is a function of the small size and/or material of the bands. Accordingly, good heat flow from the tip to the component terminals and thus to the solder to be melted is provided, this heat being localized at the component terminals and with little, if any, heat conduction or radiation to an adjacent component. Moreover, there is no need for a precise registration of the sides 10–16 with respect to the component terminals to ensure good heat flow thereto upon closure of the tweezer.

A power supply 32 is connected to the tweezers by actuation of a foot switch 34 or the like to apply an electrical current to the tip, the current serially passing through leg 18 into bands 16, 14, 12, and 10 and then back to the power supply via leg 20 where legs 18 and 20 are preferably made of a substantially rigid material where the electrical resistance of legs 18 and 20 with respect to bands 10–16 is such that the heat is primarily generated in the bands and not the legs.

In the embodiment of FIGS. 1–3, closure of tip 11 is effected via the connection of the legs 18 and 20 to the adjacent ends of bands 10 and 16. This corner closure of the tip is effective in generating heat uniformly along the working length of clamp contact because, although these corners generate heat, they are not thermally loaded by the component terminals. That is, there are no terminals 62 at the corners of the component 60 and thus no solder joints to be melted thereat.

In operation, band tip 11 provides very unique characteristics for surface mount removal and replacement applications since it can easily cope with closely spaced components requiring (a) highly localized solder reflow heating and/or (b) pick up or replacement of an individual component. Moreover, tip 11 facilitates preferred installation and removal sequences where, for removal of a component, tip 11 is clamped while cold (room temperature, for example) onto the component to be removed, heat is then applied to the tip by the passage of electrical current therethrough to reflow the solder, and then the freed component is removed with the tweezer where tweezer tip 11 now grips the component, the tip remaining at the hot reflow temperature as the component is removed.

When installing a component, the tip may be clamped about the component when cold and then used to align and place the component leads with respect to the PCB lands, the tip remaining cold at this time. Once the component is properly alinged and positioned, the tip is heated above solder reflow temperature while being firmly held by the tweezer tip where a vacuum pick or other means may also be easily employed through the upper opening of the tip to further effect holding the component in place. The tip is then cooled down while still being firmly held in place. It is then removed from the installed component.

Figure 4:
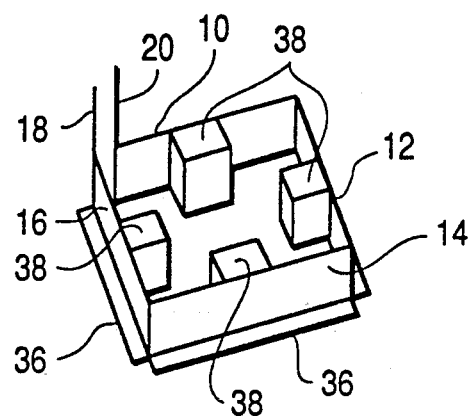
FIG. 4 is a diagrammatic, perspective view of a further illustrative tip in accordance with the invention.

The band tips provide stability for surface planarity due to the large section modulus of the band height while providing wrap compliance to the component leads or body due to the small section modulus of the band thickness. By adding flanges 36 to the bottom of a band tip, as illustrated in FIG. 4, a greater planar surface area may be established for flat pack (gull wing) lead clamping and reflow soldering. The utilization of such flanges for the foregoing purpose is discussed hereinafter with respect to a preferred embodiment of the invention as illustrated in FIG. 10B.

Moreover, as also illustrated in FIG. 4, guide or clamp blocks 38 may be incorporated inside bands 10–16 at either the sides (as illustrated) or the corners thereof to provide a non-metallic, low thermal conductivity means for positioning the heating band relative to the component body and leads to suit the particular circumstances of component installation or removal. Thus, the embodiment of FIG. 4, with optional guide or clamp blocks 38, is suitable for use with flat pack, gull wing lead systems where the surface to be heated is on the PCB at a right angle to the side surface of component 60. In this regard, the flanges 36 of bands 10–16 are particularly suited for the application of heat to a surface of the foregoing type as is the embodiment of FIG. 10B.

Figure 5:
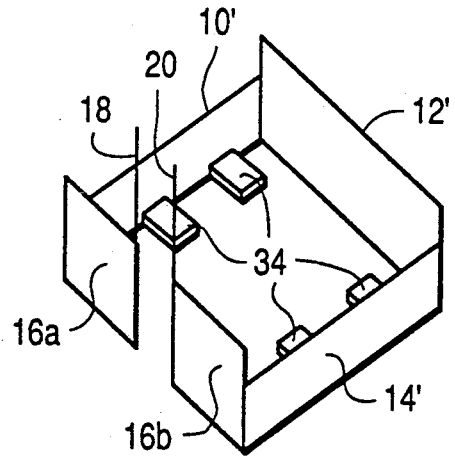
FIGS. 5, 5A, and 5B are diagrammatic views of other illustrative tips in accordance with the invention.

Referring to FIG. 5 and a further embodiment of the invention, bands may be provided for clamping and heating the leads at two sides while enveloping the component. This is effected by using different heights for the bands where the shorter bands 10' and 14' may be longer than the component and where these bands clamp and heat the leads at the two sides of the component while the taller bands 12' and 16a and 16b are relatively non-heating. In this embodiment, a side closure technique is used rather than the corner closure technique of the embodiments of FIGS. 1 and 4. Thus, legs 18 and 20 are connected to sides 16a and 16b, this side closure technique being desirable when processing an SOIC dual row lead system or the like.

In the FIG. 5 embodiment selective heating at two sides of a component is effected due to the shorter height (or smaller cross-section) of bands 10' and 14' as stated above. Selective heating may also be effected by using appropriate materials in bands 10' and 14' or by using the uniquely configured preferred embodiments of FIGS. 10A-10D.

Figure 5A:
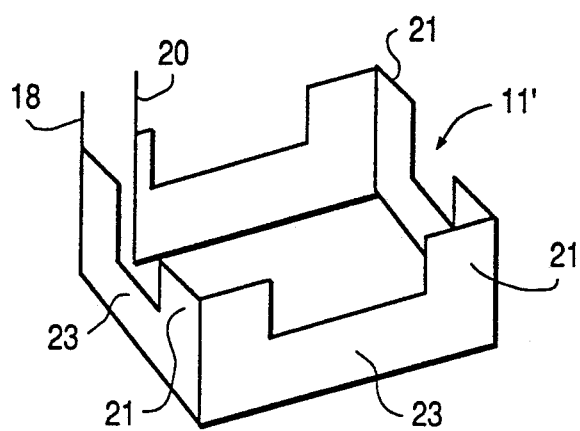

As can be seen in FIG. 5A, the corners 21 of band tip 11' may be taller than the intermediate portions 23 where band tip 11' is a modification of the tip of FIG. 1 and is illustrated as being suitable for use with components having leads at all sides thereof although this tip and those of FIG. 1 and FIGS. 10A-10D may also be configured for use with other types of components. Thus, in the FIG. 5A embodiment. heat is primarily applied to the terminals at eaoh side of the oomponent while relatively little heat is generated at the corners 21 of tip 11. Since there are no terminals at the corners of the component, the FIG. 5A embodiment is particularly safe and efficient in heat utilization and transfer.

Figure 5B:
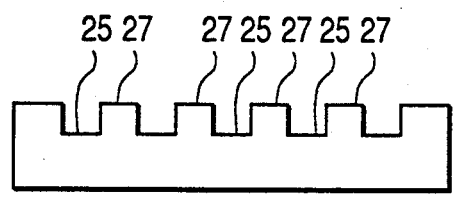

Another technique of selective heating is illustrated in FIG. 5B which illustrates one of the bands such as band 12 of the FIG. 1 with alternating shorter portions 25 and taller portions 27 where portion 25 may engage the leads of a component while portions 27 correspond to the space between the leads to thus again effect safe efficient heat utilization and transfer. This technique can also be utilized in the flanges 36 of the FIG. 4 embodiment. As can be appreciated from foregoing, other shapes of the bands and/or flanges will result in other types of selective heating.

Figure 5C:
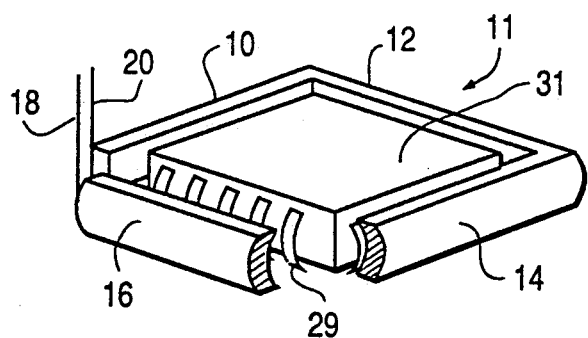
FIG. 5C is a perspective illustration in partial cross-section of a further illustrative tip in accordance with the invention.
Figure 5D:
FIG. 5D is a cross-sectional view of another illustrative tip in accordance with the invention.

In the embodiments described above the bands are flat in cross-section except for the flanged embodiment of FIG. 4. However, as illustrated in FIGS. 5C and 5D, other cross-sectional configurations may be employed where the curved cross-section of bands 10-16 of FIG. 5C or the S-shaped cross-section of FIG. 5D may conform to the curvature of terminals at the component sides to thus provide a further technique of enhancing heat transfer and ability to lift components from a board after reflow during a component removal process, as indicated in FIG. 5C where curved bands 10-16 conform in configuration to the J-leads 29 of component 31.

The above techniques of shaping the bands as discussed above with respect to FIGS. 5-5D may be used in all embodiments of the invention including those discussed below.

As can be seen in FIG. 5, fingers 34 may be utilized to facilitate removal of a component after the joints thereof have been reflowed where the fingers would extend at least between the component leads and possibly beneath the component. Thus, for certain DIP components or the like, the mounting thereof is such that they are spaced from the upper surface of the PCB. Accordingly, fingers 34 in such instances could extend beneath the component to facilitate removal thereof as the component is grasped by clamping tip 11. In this regard, fingers 34 are preferably disposed at the bottom edges of bands 10-16 where the fingers may be integrally formed with the bands and where they may be disposed at the sides (as illustrated) or the corners of the bands. Moreover, the fingers may be used with components that have leads at one or more sides thereof and may be used in all embodiments of the invention described and/or illustrated herein. Furthermore, the fingers are preferably made of material having low thermal conductivity with respect to bands 10-16 although they may be thermally conductive.

Figure 6:
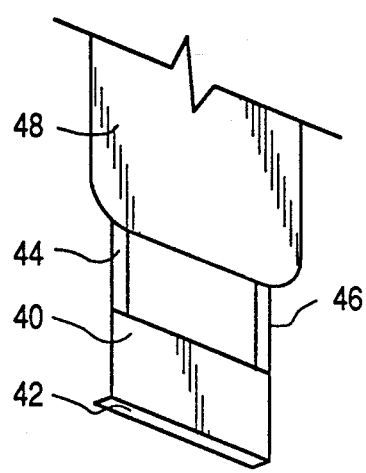
FIG. 6 is a diagrammatic, perspective view of a probe-type device utilizing a further illustrative tip in accordance with the invention.

Referring to FIG. 6, a further embodiment of the invention is illustrated where the bands do not have a full four sided envelope of the above-described embodiments although it is to be understood that the envelop need not be four-sided - that is, the envelop configuration should preferably conform to the component terminal configuration regardless of the number of sides of the component in the above-described embodiment. In the embodiment of FIG. 6, the tip may comprise a single band 40 with a straight edge or a flange 42 at the bottom thereof. The legs 44 and 46 may be connected to a probe-type hand piece such as that illustrated in U.S. Pat. Nos. 3,526,750; 3,558,854; and 4,367,396, all of which are assigned to the assignee of the subject application and which are hereby incorporated herein by reference, such a probe being diagrammatically indicated at 48 in FIG. 6. In this embodiment, current passes from leg 44 through band 40 to leg 46.

Figure 6A:
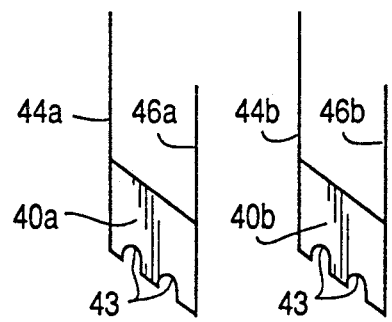
FIGS. 6A, 6B, and 6C are diagrammatic views of other illustrative tips in accordance with the invention.

Referring to FIG. 6A, opposed bands 40a and 40b are respectively connected to the arms of a tweezer-type structure. Thus, the opposed clamps can heat and clamp opposite sides of a DIP or the like. A tweezer-type structure suitable for accommodating this opposed-clamp arrangement would be that shown in FIG. 1a of above mentioned U.S. Pat. No. 3,752,017 where a first current flow would be from leg 44a through band 40a to leg 46a and a second current flow from leg 44b through band 40b to leg 46b.

Figure 6B:
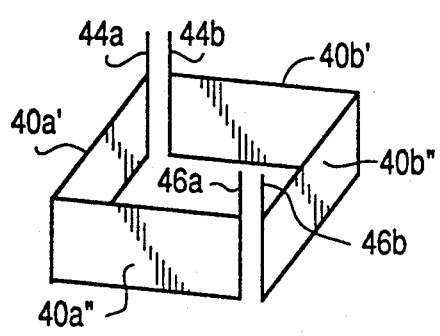
Figure 6C:
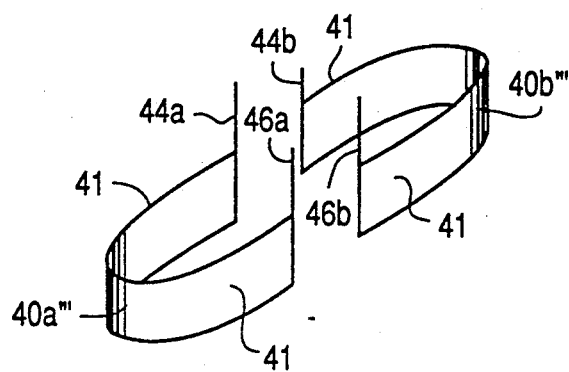

Referring to FIGS. 6B and 6C, there are illustrated further modifications of the FIG. 6A embodiment where in FIG. 6B, band 40a of FIG. 6A is replaced with bands 40a' and 40a" and band 40b is replaced with bands 40b' and 40b". Typically, the bands 40a' and 40a" are at about right angles with respect to each other as are bands 40b' and 40b" Thus, upon closure of the tweezers, the bands 40a', 40a", 40b', and 40b" may be adapted to respectively engage the terminals at the four sides of a component. Of course, this embodiment can also be used with those components having terminals at two sides thereof.

In FIG. 6C, bands 40a and 40b of FIGS. 6A are respectively replaced with semi-oblong bands 40a''' and 40b''' where the linear portions 41 of the bands may be adapted to engage the terminals at the opposite sides of a DIP or the like.

As can be appreciated from the foregoing, the bands 40a and 40b may be shaped in a variety of ways depending upon the particular application.

Moreover, the above shaping considerations including those of FIGS. 6B and 6C also apply to band 40 of FIG. 6. Thus, if band 40 were replaced by bands 40a' and 40a" of FIG. 6B, for example, (where the bands are connected to probe 48 via legs 44 and 46), the bands could first heat the terminals at two adjacent sides of a component having terminals at four sides thereof. After solder reflow at these two sides, the bands would then be re-positioned to heat the terminals at the other two sides. Furthermore, the single band embodiment of FIG. 6 can also effect the foregoing by processing the component one side at a time. In this manner, the embodiments using a probe can effect many of the operations effected by the tweezer embodiments.

The shaping considerations discussed above with respect to FIGS. 5–5D are also applicable to the bands of FIGS. 6–6C. Moreover, cut-outs 43 or the like can be utilized in the FIG. 6–6C embodiments (or in the FIG. 5–5D embodiments or the FIG. 10A–10D embodiments) where the cut-outs would also effect selective heat application in that relatively little heat would be transferred at the cut-out locations, the heat being primarily transferred at the band portions between the cut-outs.

Figure 7:
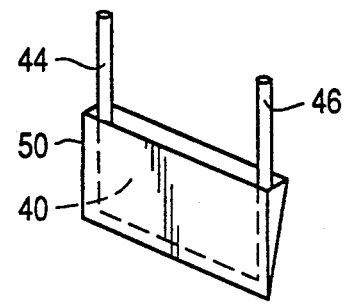
FIG. 7 is a diagrammatic, perspective view of a further illustrative tip in accordance with the invention.

Referring to FIG. 7, a modification of the embodiment of FIG. 6 is illustrated where the band or bands 40 may have applied thereto a tinnable member 50 which may be clamped, force fit, coated or otherwise attached to band 40 where a layer of thermally conductive, electrical insulating material (not shown) such as mica would be interposed between tinnable member 50 and band 40. Bands 40 may be covered with an electrically insulating, tinnable (or non-tinnable) layer (not shown) in lieu of the mica layer and tinnable member. If the tinnable member is fitted over a single band and employed with a probe-type grip, such tips are ideally suited for pre-tinning surface areas or functioning as soldering irons although it is to be understood the tinnable member(s) 50 may be employed with any of the bands of the other embodiments of the invention including those of FIGS. 1–5D and 6A–6C.

Whether a band(s) is attached to a probe type handpiece or a tweezer-type handpiece, these devices can be used as soldering irons where the band or bands correspond to an internal heat generator and the tinnable member(s) 50 correspond to a soldering iron tip where the tip may be of any desired shape including those of FIGS. 1–6C discussed above and may comprise materials typically used as soldering iron tips.

As described above with respect to the FIG. 7 embodiment and the modifications thereof with respect to the other embodiments of the invention, the various tips of the invention may be provided with a variety of sheathing or overlayer combinations to achieve various application requirements. FIGS. 8A, 8B, 9A, and 9B are directed to further illustrative embodiments of such combinations. In all embodiments of the invention, a tip, as used herein and in the appended claims, is intended to include a bare tip (or bands 10–16 per se of FIGS. 1–5D or band 40 per se of FIGS. 6–6C and 7) or the bare tip provided with various sheathing or overlayer combinations.

Figure 8A:
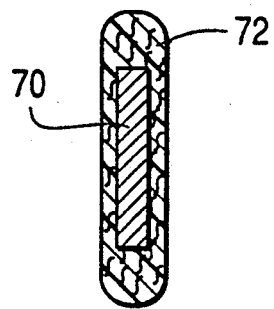
FIGS. 8A and 8B are cross-sectional views of further illustrative tips in accordance with the invention utilizing heat conductive, electrically insulative overcoatings.
Figure 8B:
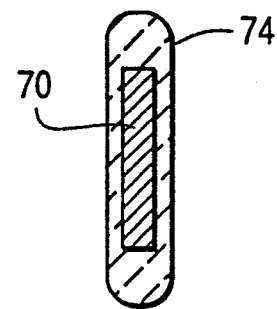

In each of the embodiments, the bare tip (or bands 10–16 of FIGS. 1–5D or band 40 of FIGS. 6–6C and 7) is indicated in cross-section as band 70 in FIGS. 8A, 8B, 9A, and 9B, it, of course, being understood a tip may comprise a plurality of bands as illustrated, for example, in FIGS. 1–5D and 6A–6C. It is upon this band that the various combinations of sheathing or overlayer may be provided. Thus, in FIG. 8A, band 70 is provided with a compliant, electrically insulative, heat conductive, non-tinnable layer 72 where the compliant material may be a Fiberglas braid or wrap or other suitable material. In the embodiment of FIG. 8B, the band 70 is provided with a rigid, electrically insulative, heat conductive, non-tinnable layer or coating 74 where the rigid material may be a ceramic compound, mica, or another suitable material.

The embodiments of FIGS. 8A and 8B are advantageous in that the electrically insulative, heat conductive, non-tinnable sheathing 72 or overlayer 74 effects heat transfer from band(s) 70 to the work yet prevents any leakage current originating in band(s) 70 from passing to sensitive components or board circuitry thereby preventing damage thereto. The compliant sleeve 72 has an additional advantage in that it facilitates good contact between the tip and the component or component leads and thus facilitates good heat transfer.

Figure 9A:
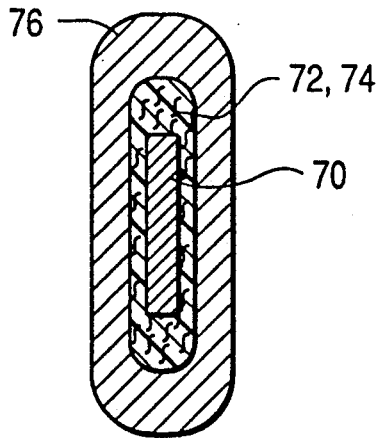
FIGS. 9A and 9B are cross-sectional views of further illustrative tips in accordance with the invention utilizing tinnable or non-tinnable overcoatings.
Figure 9B:
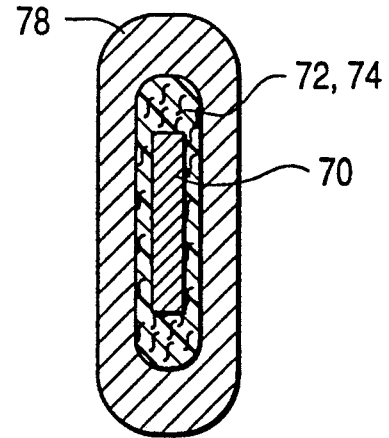

Further sheathing or overlayer combinations are illustrated in FIGS. 9A and 9B where band 70 corresponds to the bare tip as discussed above with respect to FIGS. 8A and 8B. Electrically insulating, heat conductive layer 72, 74 may either be compliant as indicated at 72 in FIG. 8A or rigid as indicated at 74 in FIG. 8B. Referring to FIG. 9A, disposed on layer 72, 74 is a compliant metallic layer or overwrap 76 where the overwrap may be non-tinnable and comprise, for example, a stainless steel braid or tinnable and comprise, for example, a copper braid.

In FIG. 9B, disposed on layer 72, 74 is a noncompliant metallic overcoating 78 which may be non-tinnable and comprise a stainless steel coating or sheathing or tinnable and comprise, for example, a copper sheathing or coating. The metallic overcoating contacts the component or component leads and may either be tinnable or non-tinnable and compliant or rigid (or any combination thereof). The metallic overwraps 76 or 78 make the tip more wear or abrasion resistant than the tips of FIGS. 8A and 8B where only an electrically insulative, heat conductive sheathing 72 or 74 is employed.

As indicated above, the overlayers 76 (FIG. 9A) and 78 (FIG. 9B) may be either tinnable or non-tinnable. If tinnable, the capability of the tip to transfer heat to the molten layer of solder residing on the tip surface is enhanced. A non-tinnable tip lacks this advantage yet has a very different advantage in that a non-tinnable tip can remain in contact with the work after power (and thus heat) to the tip has been removed and not become solder bonded to the work during the cool-down as would occur in the case of a tinnable tip such as a conventional soldering iron tip. As discussed hereinbefore, during removal of a surface mount device, it is desirable to maintain contact between the tip and the device after heat application and thus the non-tinnable feature is well suited to this mode of removal of a surface mount device.

Reference is made to FIGS. 10A–10D which are directed to modifications of the embodiments of FIG. 9A and 9B where the metallic overwrap 76 or 78 may be provided with different configurations to effect a variety of selective thermal contact patterns to suit the particular component installation/removal task at hand.

Thus, in FIG. 10A, the overwrap 76 or 78 is configured to include a straight flange portion 80, which portion is particularly adapted, for example, to horizontally (with respect to the plane of the substrate) contact component leads or terminals where components are closely spaced with respect to one another. The straight flange overwrap tip of FIG. 10A could also be used to vertically contact short gull-wing leads and/or their associated lands.

The material comprising the metallic overwrap 76, 78 of FIG. 10A may be malleable such as malleable stainless steel or copper. Moreover, the overwrap of FIGS.

9A, 9B, and the following FIGS. 10B-10D may also comprise such malleable material. Although the shaping of the metallic layers of FIGS. 10A-10C would normally be effected during manufacture thereof, such shaping could also be effected in situ by the operator if the metallic overlayer is made of a malleable material.

FIG. 10B illustrates a further modification where the overwrap 76, 78 is bent to provide a bent flange portion 82, which is particularly adapted, for example, for the installation or removal of gull-wing leaded components while FIG. 10C illustrates another modification where a curved (or contoured) portion 84 is provided which is particularly adapted, for example, to horizontally contact contoured components (or their leads) such as J-leaded components.

Various modifications may be made to the portions 80, 82, and 84 of FIGS. 10A, 10B, and 10C such as those illustrated in FIGS. 4, 5, 5A, and 5B, the provision of cut-outs, for example, being illustrated at 43 in the straight flange overwrap tip of FIG. 10D. Thus, the straight flange overwrap tip of FIG. 10A, the bent flange overwrap tip of FIG. 10B, and the contoured overwrap tip of FIG. 10C are applicable to all tip shapes and configurations and various features may be mixed and matched to effect selective contact and heat transfer to a variety of component/lead configurations.

Moreover, the various configurations of the overwrap tips of FIGS. 9A, 9B, and 10A-10C utilize the same basic tip. That is, the overwraps 76, 78 of FIGS. 9A and 9B simply follow the contour of the banded tip underneath the overwrap where the banded tip includes band 70 and electrically insulating, heat conductive layer 72, 74. Since the same banded tip may be employed in the embodiments of FIGS. 10A-10D, this basic banded tip may be standardized for all of the foregoing metallic overwrap embodiments.

In summary, the foregoing metallic overwrap embodiments of FIGS. 9 and 10 are particularly advantageous for providing either (a) non-selective heating of component/lead configurations and/or substrate lands thereof or (b) selective heating at specified locations thereof and accordingly, such metallic overwrap embodiments constitute preferred embodiments of the invention.

Further embodiments of the invention are illustrated in FIGS. 11A and 11B, these embodiments constituting tips of the type which are connected to a probe such as probe 48 of FIG. 6. The tips 86 and 88 include legs 44 and 46 which correspond to the legs 44 and 46 of the FIG. 6 tip where the legs of the FIGS. 11A and 11B embodiments are typically rounded.

The tips 86 and 88 also include flattened portions 90-96 which define an opening 98, the periphery of which is slightly larger than the periphery of a component to be installed or removed. Thus, if the component has gull-wing leads, the flattened portions 90-96 are particularly adapted to contact and transfer heat to the gull-wing lead/land contact area.

The FIG. 11B embodiment includes corner portions 100 which are bent up to avoid contacting the substrate in areas where there are no leads/lands.

In the embodiments utilizing a tweezer-type grip an adjustable limit such as disclosed in above U.S. Pat. No. 3,752,017 should be used to prevent overclosing of the tweezer to thus prevent short circuiting of legs 18 and 20. Moreover, in the embodiments of FIG. 1-5D, an adjustable limit may also be provided for preventing the tweezers from opening too wide and thus overstressing the heat band opening 52.

These and other modifications of the invention will occur to those in this art and are intended to be included within the scope of the invention as defined by the claims appended hereto.

What is claimed is:

1. A component installation/removal device having at least one current carrying tip attached thereto, said device comprising:
   a tweezer-type handpiece having first and second arms where at least one of the arms is pivotable with respect to the other to move the handpiece betwen open and closed positions;
   an electriclaly conductive heating tip including:
      a pair of electrically conductive legs, each of which is removably mounted with respect to a respective one of said arms; and
      n serially connected electrically conductive bands attached to said first and second legs, where n is an integer greater than one, where the first band is connected to the first of sad legs and the n$^{th}$ band is connected to the other of said legs such that an opening is formed within the n serially connected bands, and where the serially connected bands have sufficient resilience to allow the opening formed within the bands to be expanded and contracted by movement of the first and second arms, and the legs mounted thereon, away from and toward each other; and
   means associated with the first and second arms fo supplying electrical heating current to the serially connected bands through the pair of legs;
   whereby the serially connected bands are adapted, upon closure of the tweezer-type handpiece, to clamp terminals associated with a component and transmit heat to said terminals upon passage of electrical current through the tip to thus effect melting of solder at the terminals.

2. A device as in claim 1 where n=4 and said opening is substantially rectilinear such that said bands are respectivley disposed at the sides of the rectilinear opening and where said legs are connected to the adjacent ends of said first and fourth bands respectivley.

3. A device as in claim 1 where n=5 and said opening is substantially rectilinear and where the first and fourth bands are dispsoed at one side of the rectilinear opening and said legs are connected to adjacent ends of said first and fourth bands.

4. A device as in claim 3 where the second and fourth bands are respectively disposed at opposite sides of the opening and are smaller in cross-section than the remaining bands so that heat produced by said electrical current is concentrated in the second and fourth bands which are thus adapted to transfer said heat to the terminals of an electrical component having said terminals at two sides thereof.

5. A device as in claim 1 where the cross-sectional area of at least one first portion of at least one of said bands is smaller than that of a second portion of said one band so that said electrical current is concentrated in said one at least first portion of said one band.

6. A device as in claim 5 where said one at least band includes a plurality of alternating first and second portions.

7. A device as in claim 1 where said opening is substantially rectangular such that said bands are disposed at the sides of the rectangular opening and where the cross-sectional area of the bands at the corners of the rectangular opening are greater than at the portions of the bands intermediate the corners.

8. A device as in claim 1 including at least one cut-out disposed at the lower edge of at least one of said bands.

9. A device as in claim 1 where said bands have flanges disposed at the bottom thereof, said flanges being adapted to transfer said heat to solder joints disposed on a substrate where the substrate mounts the electrical component 10. A device as in claim 1 including clamp blocks respectively disposed on the interior surfaces of said bands where said blocks are of low thermal conductivity with respect to the bands and where the blocks are adapted to respectively engage the body of the electronic component.

11. A device as in claim 1 where the thickness of said bands is in the range of 5 to 40 mils.

12. A device as in claim 1 where said bands are made of a non-tinnable material.

13. A device as in claim 1 including a tinnable member disposed on said band in heat exchange relationship therewith whereby the device is adapted to function as a soldering device with the bands functioning as a heat generating member within the tinnable members.

14. A device as in claim 13 including a thermally conductive, electrically insulating layer disposed between the bands and the tinnable member.

15. A devic as in claim 1 including an electrically insulated tinnable member disposed on said bands in heat exchange relationship therewith.

16. A device as in claim 1 including an electrically insulative, heat conductive layer disposed on said bands in heat exchange relationship therewith.

17. A device as in claim 16 where said layer is made of a non-tinnable material.

18. A device as in claims 16 or 17 where said layer is compliant.

19. A device as in claim 18 where said layer comprises a fiberglass braid.

20. A device as in claim 16 or 17 where said layer is rigid.

21. A device as in claim 20 where said layer is made of a material selected from the group consisting of mica and ceramic.

22. A device as in claim 16 including a metallic layer disposed on said electrically insulative, heat conductive layer in heat exchange therewith.

23. A device as in claim 22 where said metallic layer is compliant.

24. A device as in claim 23 where said metallic layer is tinnable.

25. A device as in claim 24 where said tinnable layer is copper braid.

26. A device as in claim 23 where said metallic layer is non-tinnable.

27. A device as in claim 26 where said non-tinnable layer is stainless steel braid.

28. A device as in claim 22 where said metallic layer is rigid.

29. A device as in claim 28 where said metallic layer is tinnable.

30. A device as in claim 29 where said tinnable layer is copper.

31. A device as in claim 28 where said metallic layer is non-tinnable.

32. A device as in claim 31 where said nontinnable layer is stainless steel.

33. A component installation/removal device having a current caryrring tip removably connected thereto, said device comprising:
a handpiece;
an electrically conductive tip including;
first and secodn electrically conductive legs and
a tleast one band extending between and electrically connected in series with the legs in a manner creating a loop-like receptacle which extends laterally relative to an axial direction of said legs and in which a component is receivable with the at least one band extending circumferentially with respect thereto, said at least one band having an electrically insulative, heat conductive layer dispsoed thereon in heat exchange relationship thereto; and
means for connecting the first and second legs to a source of electrical power;
whereby the at least one band is adapted to transfer heat to soldered terminals associated with the component via the electrically insulative, heat conductive layer disposed thereon in response to the passage of electrical current through the at least one band so as to heat said at least one band and the electrically insulative, heat conductive layer disposed thereon, so that solder at said terminals may be melted.

34. A device as in claim 33 where said handpiece is of the probe type.

35. A device is in claim 33 where a single band is provided and said one band extends between the legs in the plane containing the legs.

36. A device as in claim 33 including at least two bands extending between said legs, said two at least bands being adapted to engage the terminals associated with two adjacent sides of a component respectively and transfer heat to the terminals in response to electrical current passing through the bands so that solder at said terminals may be melted.

37. A device as in claim 33 where said one at least band at least partially oblong in shape.

38. A device as in claim 37 where a single oblong-band is provided and said oblong-shapeed band includes two linear portions respectively connected to said legs and adapted to engage the terminals associated with opposite sides of a component respectively and transfer heat to the terminals in response to electrical current passing through the band so that solder at said terminals may be melted.

39. A device as in claim 33 including a tinnable member disposed on said at least one band in heat exchange relationship with said electrically insulative layer whereby the device functions as a soldering device with the at least one band functioning as a heat generating member with the tinnable member.

40. A device as in claim 39 wherein said thermally conductive, electrically insulating layer disposed between the band at least one and the tinnable member.

41. A device as in claim 33 where said band at least one is made of a non-tinnable material.

42. A device as in claim 33 where the cross-sectional area of at least one first porrion of said band at least one is smaller than that of a second porrion of said band at least one so that heat produced by said electrical current is concentrated in said one first portion of said band at least one.

43. A device as in claim 42 where said band includes a plurality of alternating first and second portions.

44. A device as in claim 33 including at least one cut-out disposed at the lower edge of said at least one band.

45. A device as in claim 33 where said handpiece is of the tweezer-type and where there are two of said tips respectively connected to the arms first and second of the tweezer-type handpiece such that the first of said tips includes at least one first band member extending between first and second legs connected to a first arm of the tweezer type handpiece and at least one second band member extending between third and fourth legs connected to a second arm of the tweezer type handpiece.

46. A device as in claim 45 where each of said first at least one and second at least one band members includes a single band which extends between its associated legs in the plane containing said associated legs.

47. A device as in claim 45 where each of said first at least one and second at least one band members includes at least two band extending between their associated legs, the two at least bands being adapted to engage the terminals associated with two as sides of a component respectively and the two at least bands of the second band member being adapted to engage the terminals associated with two further adjacent sides of the component respectively so that said first and second band members transfer heat to the terminals in response to electrical current passing through the band members to thus melt solder at said terminals.

48. A device as in claim 45 where each of said first and second band members at least partially oblong in shape.

49. A device as in claim 48 where each said oblong-shaped band includes two linear portions respectivley connected to said legs and adapted to engage the terminals associated with opposite sides of a component respectively and transfer heat to the terminals in response to electrical current passing through the oblong-shaped bands so that solder at said terminals may be melted.

50. A device as in claim 45 including at least first and second tinnable members respectively disposed on said first and second band members in heat exchange relationship with said electrically insulative, heat conductive layer.

51. A device as in claim 50, wherein said electrically insulative, heat conductive layer is the first of at least two thermeally conductive, electrically insulating layers respectively disposed between (a) the first band member and the frist tinnable member and (b) the second band member and the second tinnable member.

52. A device as in claim 45, wherein said electrically insulative, heat conducting layer is the first of first and second electrically insulating, tinnable members disposed on said first and second band members.

53. A device as in claim 33 where said band has a flange disposed at the bottom thereof, said flange being adapted to transfer said heat to solder joints disposed on a substrate where the substrate mounts said electrical component.

54. A device as in claim 33 where the thickness of said at least one band is in the range of 5 to 40 mils.

55. A device as in claim 33 including a metallic layer disposed on said electrically insulative, heat conductive layer in heat exchange relationship therewith.

56. A device as in claim 55 where said metallic layer is compliant.

57. A device as in claim 56 where said metallic layer is tinnable.

58. A device as in claim 57 where said tinnable layer is copper braid.

59. A device as in claim 56 where said metallic layer is non-tinnable.

60. A device as in claim 59 where said non-tinnable layer is stainless steel braid.

61. A device as in claim 55 where said metallic layer is rigid.

62. A device as in claim 61 where said metallic layer is tinnable.

63. A device as in claim 62 where said tinnable layer is copper.

64. A device as in claim 55 where said metallic layer is non-tinnable.

65. A device as in claim 64 where said non-tinnable layer is stainless steel.

66. A device as in claim 55 where the onfiguration of said metallic layer is substantially the same as that of said electrically insulative, heat conductive layer.

67. A device as in claim 66 including an electrically insulating, tinnable member disposed on said bands.

68. A device as in claim 55 where said metallic layer includes a first portion which engages said electrically insulative, heat conductive layer and a heat transfer portion extended from said first portion and adapted to engage said component terminals.

69. A device as in claim 68 where said first portion of the metallic layer substantially extends in a first direction and said heat transfer portion extends from said first portion in substantially said first direction.

70. A device as in claim 69 where said heat transfer portion of the metallic layer is substantially planar.

71. A device as in claim 68 where said heat transfer portion of the metallic layer is substantially planar.

72. A device as in claim 68 where said first portiom of the metallic layer substantially extends in a first direction and said heat transfer portion extends in a direction substantially perpendicular to said first portion.

73. A device as in claim 72 where said heat transfer portion of the metallic layer is substantially planar.

74. A device as in claim 73 where said first portion of said metallic layer is substantially planar.

75. A device as in claim 68 where said heat transfer portion of the metallic layer is curved at least along a part of the length thereof.

76. A device as in claim 55 where said metallic layer is made of a malleable material.

77. A device as in claim 76 where said material is malleable stainless steel.

78. A tip for use with a component installation/removal, tweezer-type handpiece having first and second arms where at least one of the arms is pivotable with respect to the other to move the handpiece between open and closed positions, said tip comprising:

a pair of electrically conductive legs respectively adapted for removing mounting with respect to the arms;

n serially connected bands electrically connected to said first and second legs where n is an integer greater than 1 and where the frist band is electrically connected to the first of said legs and the nth band is electrically connected to the other of said legs such that an opening is formed within the n serially connected band; and means for connecting the legs to a source of electrical power;

whereby the serially connected bands possess sufficient resilience to enable upon closure of the tweezer-type handpiece by pivoting of said arms relative to each other, clamping of a rectilinearly-shaped electronic component and are adapted to transmit heat to soldered terminals associated with the component upon passage of electrical current through the tip to thus effect melting of solder associated with said terminals.

79. A tip as in claim 78 where n=4 and said opening is substantially rectilinear such that said bands are respectively disposed at the sides of the rectilinear opening and where said legs are connected to the adjacent corners of said first and fifth bands respectively.

80. A tip as in claim 78 where n=5 and said opening is substantially rectilinear and where the first and fifth bands are dispoed at one side of the rectilinear opening and said legs are conencted to adjacent corners of said first and $n^{th}$ fifth bands.

81. A tip as in claim 80 where the second and fourth bands are respectively disposed at opposite sides of the opening and are smaller in cross-section than the remaining bands so that heat produced by said electrical current is concentrated in the second and fourth bands which are thus adapted to transfer said heat to the terminals of an electrical component having said terminals at two sides thereof.

82. A tip as in claim 78 where the cros-section area of at least one first portion of at least one of said bands is smaller than that of a second portion of said one at least band so that said electrical current is concentrated in said one first portion of said one band.

83. A tip as in claim 82 where said one at least band includes a plurality of alternating first and second portions.

84. A tip as in claim 78 where said opening is substantially rectilinear such that said bands are disposed at the sides of the rectilinear opening and where the cross-sectional area of the bands at the corners of the rectilinear opening are greater than at the portions of the bands intermediate the corners.

85. A tip as in claim 78 including at least one cut-out disposed at the layer edge of at least one of said bands.

86. A tip as in claim 78 where said bands have flanges disposed at the bottom thereof, said flanges being adapted to transfer said heat to solder joints disposed on a substrate where the substrate mounts the electrical component.

87. A tip as in claim 78 including clamp blocks respectively disposed on the interior surfaces of said bands where said blocks are of low thermal conductivity with respect to the bands and where the blocks are adapted to respectively engage the body of the electronic component.

88. A tip as in claim 78 where the thickness of said bands is in the range of 5 to 40 mils.

89. A tip as in claim 78 where said bands are made of non-tinnable material.

90. A tip as in claim 78 inclduijg a tinnable member disposed on said bands in heat conductive relationship thereto whereby the device is adapted to function as a soldering device with the bands functioning as a heat generating member within the tinnable member.

91. A tip as in claim 90 including a thermally conductive, electrically insulating layer disposed between the bands and the tinnable member.

* * * * *